Dec. 7, 1943.  E. W. KAISER  2,336,402
SHOWER BATH MECHANISM
Filed Aug. 4, 1940
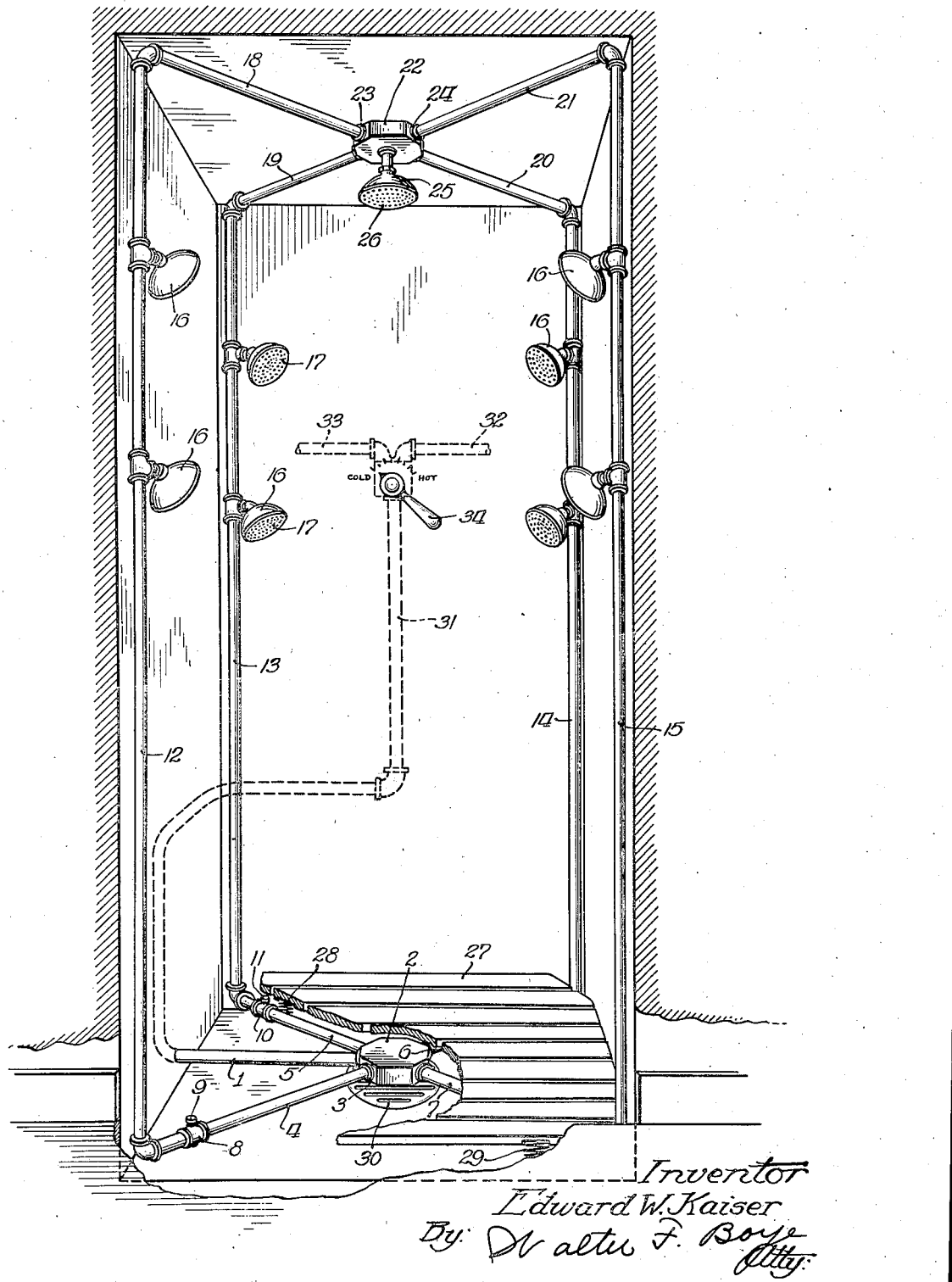
Inventor
Edward W. Kaiser
By Walter F. Boye
Atty.

Patented Dec. 7, 1943

2,336,402

UNITED STATES PATENT OFFICE 2,336,402

SHOWER BATH MECHANISM

Edward W. Kaiser, Chicago, Ill., assignor to Albert G. Kaiser, Chicago, Ill.

Application August 4, 1940, Serial No. 351,404

3 Claims. (Cl. 4—152)

This invention relates to mechanism for projecting streams of water upon a fixed object and relates more particularly to mechanism commonly referred to as a shower bath in which the turning on or off of water is not dependent upon the conventional turning of valves.

An object of my invention is to provide an improved shower bath which is especially adapted as a device particularly useful in laboratories where caustic chemicals frequently irritate or burn the skin so that rapid application of water is highly desirable.

I illustrate in the drawing a form of my invention in which the same is shown in perspective with parts, such as the platform, broken away.

In the drawing, reference character 1 represents an intake pipe connected with a hexagonal distributing box 2, having four openings 3 for insertion in said openings of pipes 4, 5, 6 and 7. Each of these pipes is provided with valves, pipe 4 showing the valve on the same as reference character 8, having a spring mechanism 9 for opening and closing said valve, 10 and 11 are similar valve and similar spring mechanism on pipe 5, and similar valves are positioned on pipes 6 and 7, although the same do not appear on the figures since they are concealed by the platform hereinafter referred to. 12, 13, 14 and 15 are the upright extensions of the pipes 4, 5, 6 and 7. 16 are the backs of the plurality of the dispensing mechanism having perforated spray discs 17 therein for the purpose of finely dividing the water. 18, 19, 20 and 21 are the horizontal extensions of said pipes, said last named extensions converging in a distributing box 22, the connections between said pipes 18 and 21 being shown at 23 and 24, the connections of the pipes 19 and 20 with said box not being visible in the drawing, since they are behind said distributing box. 25 is a distributing mechanism suspended from the distributing box 22 having a perforated spray disc 26 therein, said disc being substantially like the discs 17. 27 is a platform near the bottom of the device normally positioned slightly above the pipes 4, 5, 6 and 7 resting on springs 28 and 29. Two other springs (concealed by the platform) in each of the other corners of the mechanism shown, and the springs are of such height, and the position of said platform is so adjusted with reference to the springs 9 and 11 in the pipes 4 and 5 and similar springs in the pipes 6 and 7, that when the weight of a human being is placed upon said platform it will press down against one or more of the springs in the pipes 4, 5, 6 and 7 and will open the valve therein so that water will be distributed through one or more of the pipes 12, 13, 14 and 15 and will be diffused through the perforated discs 17 and 26. 30 are drainage slots to drain the water, 31 is an extension on the intake pipe, 32 and 33 are the cold and hot intake pipes and 34 a lever for adjusting the temperature of the water.

I have shown my improved invention with the mechanism for the regulation of the temperature of the water, as shown by reference characters 32, 33 and 34, although in the usual chemical laboratory the item of temperature of the water may be unimportant or entirely superfluous. In that case the device may be built by omitting the temperature control mechanism or it may be built with the same and set at any given temperature and thereafter ignored. Where my device, however, is used for strictly shower bath purposes the temperature control mechanism is desirable, and in practice it will be preferable to have the control mechanism on the side of the shower chamber rather than at the back as shown in the drawing.

The platform 27 is suspended upon four springs, of which 28 and 29 alone are shown since the platform itself is shown broken away, but there are springs similar to 28 and 29 at corresponding places along pipes 4 and 5. The platform is so positioned with reference to the spring valves 9 and 11 that when the weight of the human body steps upon the platform 27 at any place at least one of the said valves will have contact with the bottom of the platform 27 and will open the valve to permit the water which comes through the distributing box 2 by means of the pipe 1 up into one or more of pipes 12, 13 and 14, and through the same to be forced through the perforated discs 27 and 16. It will be noted that not more than one of the pipes 4, 5, 6 and 7 need to be opened by means of the valves therein by contacting the platform 27, but that the water may be distributed through the intake pipe 1, the distributing box 2 through any one of pipes 4, 5, 6 and 7 and the extensions 12, 13, 14 and 15 up into the distributing box 22 as well as through the aperture openings 17.

It will be found that my device is particularly useful in chemical laboratories where the undelayed application of water is of extreme importance.

The invention is not to be understood as restricted to the details set forth, since these may be modified within the scope of the appended claims without departing from the spirit and scope of my invention.

Having thus described my invention, what I claim as new and desire to secure by Letters Patent is:

1. A device of the character described providing means for receiving water under pressure, a distributing chamber having a plurality of outlet pipes therefrom, each of said pipes provided with a spring valve, a platform located above said valves so positioned that when pressure is applied to the platform immediately adjacent to one or more of said valves that the same will open and permit water under pressure to flow therethrough, each of said outlet pipes terminating in a second distributing chamber provided with means for diffusing water flowing through any one or more of said pipes.

2. A device of the character described comprising a platform supported on springs normally out of contact with a plurality of water supply pipes terminating in a central distributing chamber, each of said pipes provided with a valve spring in close contact to said platform so that when weight is applied to said platform one or more of said valves will be opened and permit water to flow therethrough, each of said plurality of pipes terminating in a second distributing chamber, and means on said distributing chamber for diffusing water passing through said pipes.

3. A device of the character described, a platform, springs supporting the platform at the corners thereof and normally holding the same in elevated position, a supply pipe entering into a distributing chamber beneath said platform, a plurality of outlet pipes extending from said distributing chamber, each of said outlet pipes provided with spring valves near the corners of said platform and terminating in a second distributing chamber above said platform, and means extending from said second distributing chamber for diffusing water.

EDWARD W. KAISER.